C. F. RUBSAM.
VEHICLE WHEEL.
APPLICATION FILED DEC. 15, 1917.

1,420,448.

Patented June 20, 1922.
2 SHEETS—SHEET 1.

Inventor
Charles F. Rubsam
By his Attorneys
Emery, Booth, Janney & Varney

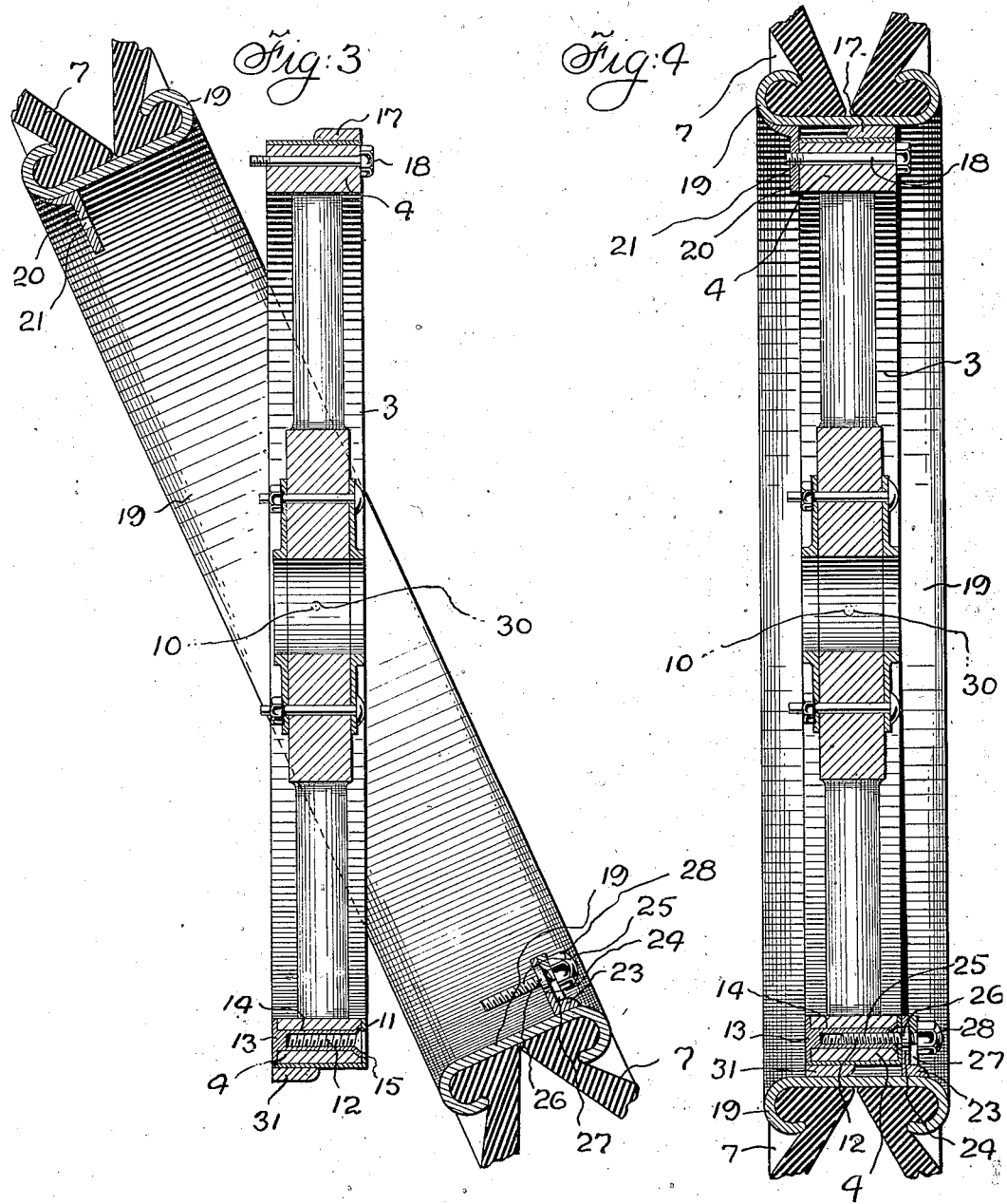

UNITED STATES PATENT OFFICE.

CHARLES F. RUBSAM, OF BROOKLYN, NEW YORK.

VEHICLE WHEEL.

1,420,448.  Specification of Letters Patent.  Patented June 20, 1922.

Application filed December 15, 1917. Serial No. 207,343.

*To all whom it may concern:*

Be it known that I, CHARLES FERDINAND RUBSAM, a citizen of the Republic of France, and a resident of the borough of Brooklyn, city, county, and State of New York, have invented an Improvement in Vehicle Wheels, of which the following is a specification.

My invention relates generally to improvements in the construction of wheels for vehicles and more particularly to the wheels of automobiles and the like provided with the so-called removable or detachable rims. One of the objects of my invention is to provide in a detachable or demountable rim and associated wheel base an arrangement of parts which renders the rim easy to attach or detach as the case may be. Further objects of my invention will be in part obvious and in part pointed out hereinafter.

For purposes of illustration I have shown a preferred embodiment of my invention in the accompanying drawings, and therein:

Figure 3 is a cross section of the wheel base and associated rim showing the rim being applied to the wheel base; and Figure 4 is a cross section of the entire wheel showing the rim in place on the wheel base.

Figure 1:
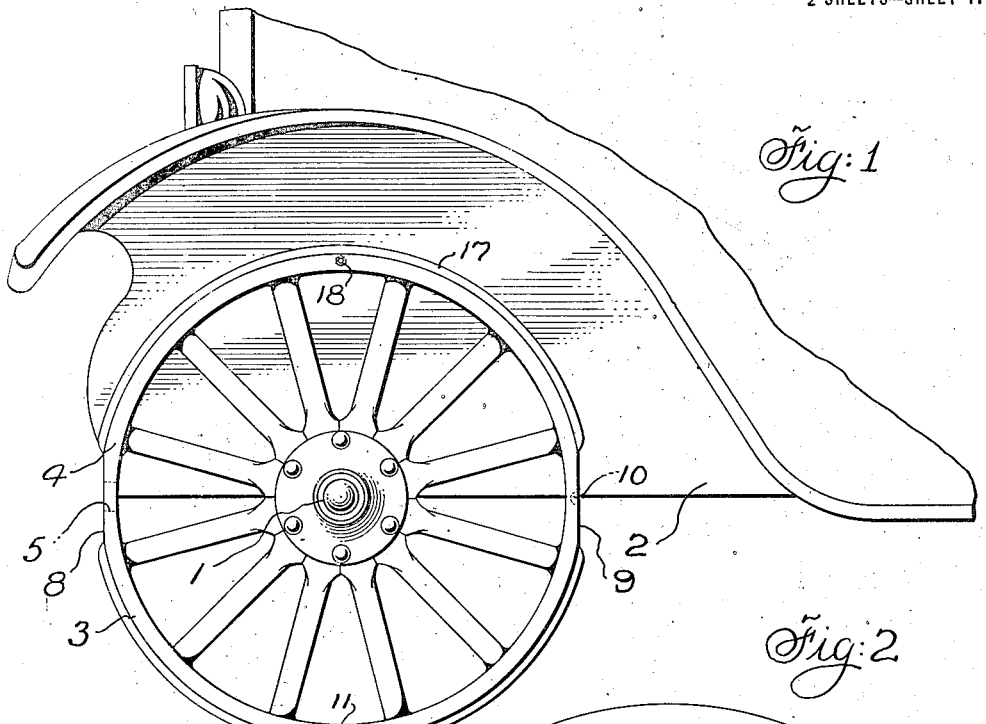
Figure 1 is a plan view of the wheel base in position on the axle of the vehicle with the rim removed.
Figure 2:
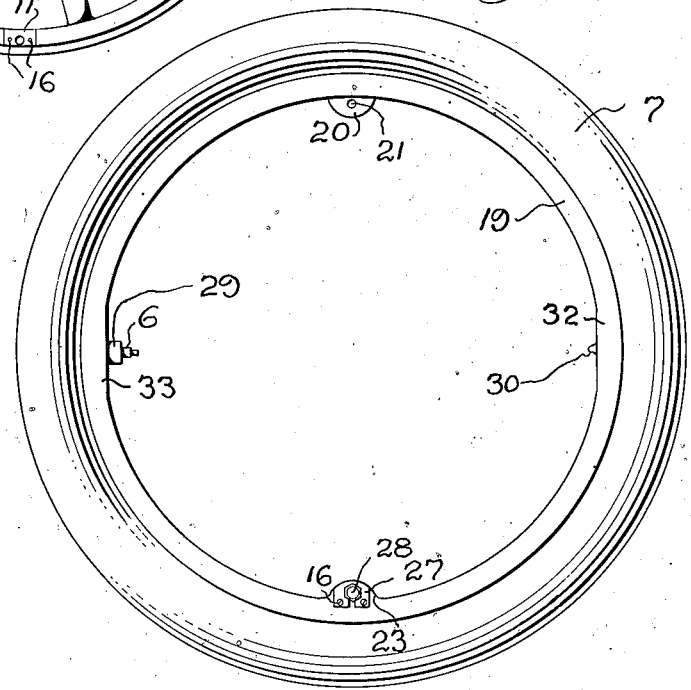
Figure 2 is a plan view of the rim and associated tire.

Mounted on the axle 1 of the automobile or other vehicle 2 is the wheel body 3 having the peripheral portion or felly 4 and felly band. The felly 4 and felly band have the usual radial slot or aperture 5 adapted to permit the passage of the tire valve 6 of the tire therethrough. It is of course to be understood that other tires than the usual pneumatic tire may be employed, in which case the tire valve may be positioned either on the side of the tire, or, where the tire is made of solid material, may be omitted altogether. For ease in assembling the rim on the wheel I prefer to provide the wheel body adjacent the aperture 5 with the flattened portion 8. At a second portion of the wheel body, which is preferably but not necessarily located substantially diametrically opposite the flattended portion 8, a similar flattened portion 9 is provided, said portion 9 having the depression 10 therein.

Intermediate the portions 8 and 9 of the wheel body, the latter is provided with the socket member 11 which is internally screwthreaded as at 12 and is provided with the backing and reinforcing flange 13. In order to further strengthen the socket member and to maintain the same fixedly in position in the transverse opening 14 of the wheel body, in which said socket member 11 is located, I provide the apertured plate 15 and the bolts 16 passing through the members 13 and 15 and serving to hold the same and the associated socket member 11 in position in the wheel body. The socket member 11 is located on that side of the felly which is remote from the vehicle. I may provide the two portions of the outer surface of the wheel body between the flattened portions 8 and 9 with the raised bearing surfaces 17 and 31. At another portion of the wheel body, intermediate the flattened portions 8 and 9 and preferably opposite the socket member 11, there is provided the bolt 18 for a purpose subsequently to be described.

The rim 19 is provided on that side thereof which is nearer to the vehicle when the rim is in position on the wheel body with the flange or similar member 20 provided with the aperture 21 so disposed as to coöperate with the bolt or other means 18 to assist in maintaining the rim in position on the wheel body, as will hereinafter be more fully set forth. At another portion of the rim 19, on that side of the same which is remote from the vehicle, the rim is provided with the flange or similar member 23, having therein the aperture 24 through which passes the bolt 25 provided with the fixed collar 26 which is positioned within the aperture 24. The bolt 25 is mounted to be rotatable within the aperture 24 by being held in place in the flange by means of the slotted plate 27 which is riveted or otherwise attached to the flange 23 and is interposed between the collar 26 and the head 28 of the bolt 25. The bolt 25 is so positioned as to co-operate with the socket member 11 when the rim is in position on the wheel body. On one point of the inner surface of the rim the same is provided with the bearing or pivot surface 29 which may, for example, comprise a thimble welded or otherwise fastened to the rim and adapted, if desired, to permit the passage of the tire valve 6 therethrough. At another portion of the inner surface of the rim, preferably, but not necessarily, at a point substantially diametrically opposite the member 29, is the projection 30 providing a second bearing or pivot surface.

In use, the rim 19 and associated tire 7 are applied to the wheel body in such a way that the member 29 enters the aperture 5. In order to facilitate the application of the rim to the wheel body, the rim is provided on its inner surface with the flattened portions 32 and 33 adjacent the members 29 and 30, respectively, for co-operating with the corresponding flattened portions 8 and 9 of the felly 4. The rim is now turned about the member 29 as a pivot until the same may be brought over the wheel into such a position that the member 30 will enter the depression 10 (see Figure 3). In this position, the rim and felly will resemble two circles in different planes and substantially contacting only at the points corresponding to the members 29 and 30. The rim is now swung about an axis substantially passing through the members 29 and 30 until the bolt 25 is caught in the first thread of the threaded surface 12 of the socket member 11. The operation of the bolt, by means of any suitable tool, such as a wrench, serves to swing the rim 19 about the axis referred to, into position on the wheel body, the rim 19 when in position on said wheel body having a tight fit thereon at a plurality of points. Whereas illustrated, the bearing surfaces 17 and 31 are provided, there will be substantially continuous contact between the rim and the felly along the corresponding surfaces of the same. In order to more securely position the rim on the felly I may provide one or more bolts 18 passing through the felly and co-operating with the threaded aperture 21 of the member 20 to clamp the rim onto the felly at this point, as clearly shown in Figure 4.

For detaching the rim from the wheel it is merely necessary to unscrew the bolt 18 and thereafter, by operating the bolt 25 in a direction reverse to that employed in attaching the rim, force the rim off the wheel body by a swinging movement in a reverse direction to the swinging movement involved in applying the rim, both swinging movements taking place about an axis substantially passing through the members 29 and 30.

It is of course to be understood that the bolt 25 is short enough and has sufficient free play in its bearings to enable it to readily enter the socket 12 when operated in one direction and to readily leave the same when operated in the reverse direction. For convenience in applying the rim to the wheel body it is preferred that the bearing surface 17 be nearer one edge of the wheel body, while the bearing surface 31 be nearer the other edge of the wheel body. However, it is apparent that the location of the bearing surfaces may be varied in many ways without departing from the spirit of the present invention.

From the foregoing description, it will be seen that the device herein described embodies the several features of my invention and attains the objects of the same, and is well suited to meet the requirements of practical use.

As many different embodiments of the present invention could be made without departing from the scope thereof, it is intended that all matter contained in the above description or shown in the accompanying drawings shall be interpreted as illustrative merely and not taken in a limiting sense.

Throughout the specification and claims, wherever the term "cylindrical" is employed, I mean to designate thereby any desired width of bearing surface down to an edge.

What I claim is:

1. A vehicle wheel comprising a wheel body, a removable rim for said wheel body, means associated with said wheel body and rim for swinging the latter into position on the former about a diametral line of the wheel body as an axis, and a plurality of raised substantially cylindrical bearing members interposed between said rim and wheel body, one of said raised bearing members being on one side and another of said raised bearing members being on the other side of a plane passing through said wheel body and through said axis.

2. A vehicle wheel comprising a wheel body, a removable rim for said wheel body, means associated with said wheel body and rim for swinging the latter into position on the former about a diametral line of the wheel body as an axis, and a plurality of raised substantially cylindrical bearing members each extending through an arc of not exceeding 180° interposed between said rim and wheel body, one of said raised bearing members being nearer the vehicle side while another of said raised bearing members is nearer the outer side of the wheel.

3. A vehicle wheel comprising a wheel body, a removable rim for said wheel body, and means associated with said wheel body and rim for swinging the latter into position on the former about a diametral line of the wheel body as an axis, and a plurality of raised substantially cylindrical bearing members each extending through an arc of not exceeding 180° interposed between said rim and wheel body, said raised members being attached to said wheel body and one of said raised bearing members being nearer the vehicle side while another of said raised bearing members is nearer the outer side of the wheel.

4. A vehicle wheel comprising a wheel body, a removable rim for said wheel body, means associated with said wheel body and rim for swinging the latter into position on the former about a diametral line of the wheel body as an axis, and a plurality of raised substantially cylindrical bearing members each extending through an arc of not exceeding 180° interposed between said rim and wheel body, said raised bearing members being attached to said wheel body.

5. A vehicle wheel comprising a wheel body, a removable rim for said wheel body, means associated with said wheel body and rim for swinging the latter into position on the former about an axis passing through two diametrically opposite portions of the wheel body, raised substantially cylindrical bearing means associated with one portion of the wheel, and raised spacing means associated with another portion of the wheel, whereby the rim is substantially equally spaced from the wheel body when in position thereon.

In testimony whereof, I have signed my name to this specification this eleventh day of December, 1917.

CHARLES F. RUBSAM.